United States Patent [19]

Iwashita et al.

[11] Patent Number: 4,660,935
[45] Date of Patent: Apr. 28, 1987

[54] LIQUID CRYSTAL DISPLAY DEVICE HAVING ELECTRODES SHAPED TO COMPENSATE FOR POSITIONING ERROR

[75] Inventors: Yukihiro Iwashita; Kotaro Ueno, both of Shiojiri, Japan

[73] Assignee: Seiko Epson Corporation, Tokyo, Japan

[21] Appl. No.: 704,106

[22] Filed: Feb. 21, 1985

[30] Foreign Application Priority Data

Feb. 21, 1984 [JP] Japan ................................. 59-31032
Feb. 28, 1984 [JP] Japan ................................. 59-36781

[51] Int. Cl.⁴ ............................................. G02F 1/13
[52] U.S. Cl. ................................. 350/336; 350/339 R
[58] Field of Search ........................... 350/336, 339 R

[56] References Cited

U.S. PATENT DOCUMENTS

| | | | |
|---|---|---|---|
| 4,231,640 | 11/1980 | Funada et al. | 350/335 X |
| 4,375,317 | 3/1983 | Funada et al. | 350/336 X |
| 4,392,717 | 7/1983 | Shibuya et al. | 350/336 X |
| 4,487,480 | 12/1984 | Nonomura et al. | 350/336 X |

*Primary Examiner*—John K. Corbin
*Assistant Examiner*—Richard F. Gallivan
*Attorney, Agent, or Firm*—Blum Kaplan Friedman Silberman & Beran

[57] ABSTRACT

A matrix-type liquid crystal display device for use in alphanumeric and television displays, and the like, has a screen in which division of images produced by the display screen resulting from assembly error is eliminated by means of reduction in the areas of the picture forming elements near the region where end portions of the signal electrodes project between control electrodes.

26 Claims, 24 Drawing Figures

LIQUID CRYSTAL DISPLAY DEVICE HAVING ELECTRODES SHAPED TO COMPENSATE FOR POSITIONING ERROR

BACKGROUND OF THE INVENTION

This invention relates to a matrix-type liquid crystal display device which is useful for the picture display in alphanumeric display units, gaphic display units, liquid crystal television receivers, and the like. More particularly, the invention relates to a matrix-type liquid crystal display device which is intended to be driven on a time division basis.

A panel of an existing matrix type liquid crystal display device which is adapted to be driven on a time division basis is shown in FIG. 16. Such a display has, for driving with a duty ratio of one in sixty-four, one hundred twenty-eight scanning electrodes CC on one substrate and sixty-four, each, signal electrodes AA and BB extending in from opposite sides of a second substrate and lying across the one hundred twenty-eight scanning electrodes forming one hundred twenty-eight picture elements along each scanning electrode. Signal electrodes AA are formed in such a way as to extend slightly beyond scanning electrode CC 65. The signal electrodes AA and BB are separated by a distance which is sufficient to assure sufficient etching to avoid creation of short-circuit or leakage paths. The extensions thus provided avoid the possible ill effects of displacement of the substrates during assembly.

In order to prevent the formation of defective picture elements as a result of misalignment of the electrodes, in the region between the crossing of scanning electrodes CC 64, and CC 65 over signal electrodes AA and BB, it has heretofore been essential to enlarge the sum of the lengths of extending portions of signal electrodes AA and BB as well as the distance between scanning electrodes CC 64 and CC 65. As a result, displayed images are divided in two along the line between scanning electrodes CC 64 and 65. Further, if the distance between the remaining scanning electrodes is kept similar to that between electrodes CC 64 and CC 65, the area of the picture elements of a display becomes too small. On the other hand, if the distance betwen scanning electrodes CC 64 and 65 is reduced, the possiblity of assembly misalignment is enhanced, scanning electrodes CC 64 and CC 65 and signal electrodes AA and BB do not overlap sufficiently, while the size of the picture elements is reduced in proportion to the misalignment and the display is divided again noticeably into two sections along the line between scanning electrodes CC 64 and CC 65 because the sizes of the picture elements on either side of the dividing line are different.

SUMMARY OF THE INVENTION

In a matrix-type liquid crystal display of the present invention as illustrated in the below-described embodiments, the scanning electrodes and the two sets of signal electrodes are formed in the known manner on opposite substrates, being positioned so that the signal electrodes cross the scanning electrodes from opposite sides. A layer of liquid crystal material is interposed between the electrodes. Individual picture elements are formed at the points of crossing of the electrodes and when signal and scanning voltages are applied to the respective substrates, light is produced between the electrodes, at least one set of which is transparent to permit viewing. As in the known display devices, the end portions of the signal electrodes extend into the region between adjacent scanning electrodes which are centrally positioned in the display area, where they nearly meet. According to the invention, assembly errors in centering the end portions of the signal electrodes where they project into the region between the two scanning electrodes are corrected by providing masks or cut-outs which reduce the areas of the picture forming elements on at least one side of the aforesaid region. The reduction in area can be effected by locating a mask on the signal electrode through which the individual picture element is viewed, or by cutting away a portion of the signal electrode in the picture element area.

When misalignment of the substrates carrying the oppositely disposed electrodes occurs, a mask or a cut-out is shifted into each picture forming element, and effectively reduces the area. By so modifying the areas of the picture forming elements, the effect of the perceived dividing line in the divided display area can be significantly blurred. By successively smaller reductions of the areas of picture forming elements produced along scanning electrodes which are successively further away from the first pair of scanning electrodes the effect of the alterations is made more gradual, so that the perceived dividing line in images formed on that display substantially disappears. The reduction of the picture forming elements can be effected by cut-outs in the signal electrodes between the signal forming elements in question or by similarly placed light shielding masks.

The liquid crystal display device of the present invention is particularly useful for structures in which the electrodes having the extended portions in the display region are used as signal electrodes, while the electrodes opposed thereto through the liquid crystal are used as scanning electrodes. As an example of such liquid crystal display device, in some cases, the signal electrodes are extended across the substrate from both sides of the substrate and the means for changing the area of the picture forming elements are provided on the signal electrode carrying substrate in areas near to the opposing extended end portions of the signal electrode. In some cases where the signal electrodes are extended into the display region from both sides of the substrate, the picture element area changing means are provided on the signal electrode carrying substrate in the vicinity of the extended end portions of both signal electrodes.

The electrodes having the extended end portions in the display region can, of course, be used as scanning electrodes.

It is another feature of matrix-type liquid crystal display devices of the present invention that the areas of picture forming elements near the region of the display containing the extended end portions of electrodes are varied from picture forming elements nearest to the region and are reduced step by step for picture forming elements further from the region. The range of possible assembling error can be enlarged and display without abnormality can be realized.

It is an object, therefore, of the present invention to provide a matrix-type liquid crystal display which provides a large number of picture elements in the display area while eliminating degradation of the quality of the display due to the effects of mispositioning the electrode-carrying substrates at the time of assembly.

It is another object of the invention to privide a display in which division of images produced by the matrix-type liquid crystal display due to error in positioning the scanning electrodes relative to the signal electrodes is eliminated.

It is a still further object of the invention to assure excellent quality in images produced by a liquid crystal display.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 16:
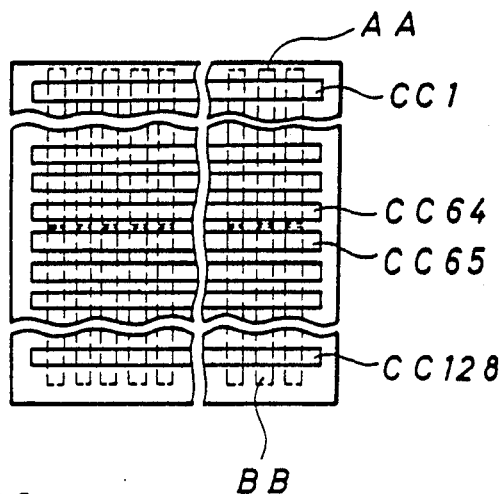
FIG. 16 is a plan view of a prior art liquid crystal display panel.
Figure 1:
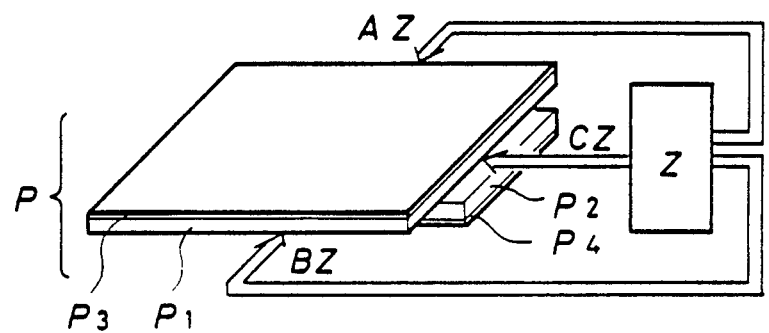
FIG. 1 is a perspective schematic view of an embodiment of the elements of a liquid crystal display device in accordance with the present invention.

FIG. 1 shows a liquid crystal display, in accordance with the present invention, which utilizes a liquid crystal display assembly P of the twisted nematic type. Liquid crystal display assembly P is composed of substrate $P_1$ which carries two sets of signal electrodes on one side of the liquid crystal layer, substrate $P_2$ which carriers the scanning electrodes, and polarizers $P_3$ and $P_4$ which are disposed on the substrates on the side thereof spaced from the liquid crystal layer. The orientation of the liquid crystal molecules between the substrates is twisted (homogeneous orientation of the electrode substrate surfaces) at an angle of 90° (between approximately 80° and 100°). Polarizers $P_3$ and $P_4$ are also disposed, through matching of their polarizing axes, to correspond to the orientation of the liquid crystal. Driving circuit Z provides particular signals for generating displays of letters, graphs, images, etc., and applies scanning signal CZ to the scanning electrodes and data signals AZ and BZ, synchronized with the scanning signal, to both sets of signal electrodes.

Figure 2:
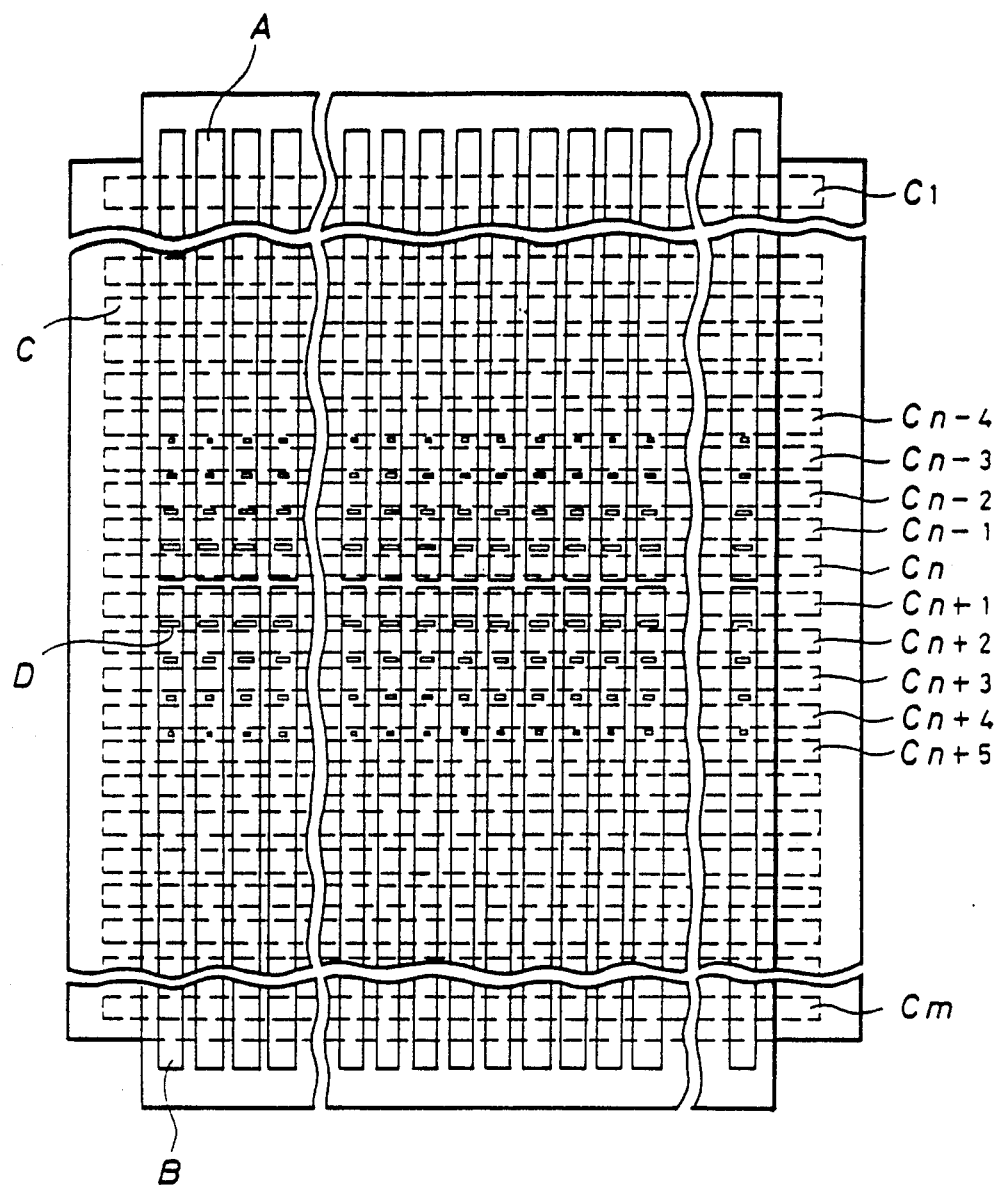
FIG. 2 is a plan view of an embodiment of a pair of aligned liquid crystal display substrates which form a part of the liquid crystal display device of FIG. 1.

FIG. 2 is a plan view of the two liquid crystal display substrates P of the liquid crystal display of FIG. 1, with polarizers $P_3$, $P_4$ eliminated for clarity of presentation. Scanning electrodes C are indicated by solid lines, while signal electrodes A and B are indicated by broken lines. Scanning electrodes C are numbered from $C_1$ to $C_m$; the time-division driving signals applied to scanning electrodes $C_1$ to $C_n$ are applied in overlapping fashion to scanning electrodes $C_{n+1}$ to $C_m$. Here, m is generally a number between n+1 and 2n. The electrodes of signal electrode sets A and B extend toward each other from opposite sides of their substrate, protruding into the region between scanning electrodes $C_n$ and $C_{n+1}$. Picture elements are formed at the points of intersection of scanning electrodes C with signal electrodes A and B. At least the set of electrodes carried on the substrate through which the display is viewed is made of a transparent conducting material.

It is a principle of the invention that inactive areas (the area D in FIG. 2) are formed between picture elements which lie adjacent to the interelectrode region containing the extended ends of signal electrodes A and B. For example, portions of signal electrodes A are cut away or masked in the region between scanning electrodes $C_n$ and $C_{n-1}$, $C_{n-1}$ and $C_{n-2}$, $C_{n-2}$ and $C_{n-3}$, and between $C_{n-3}$ and $C_{n-4}$. The inactive electrode areas D are large next to the extended end region of signal electrode A and become smaller, finally disappearing at picture elements locations substantially removed from the region containing the extended ends. The same is true of signal electrode B.

Figure 3:
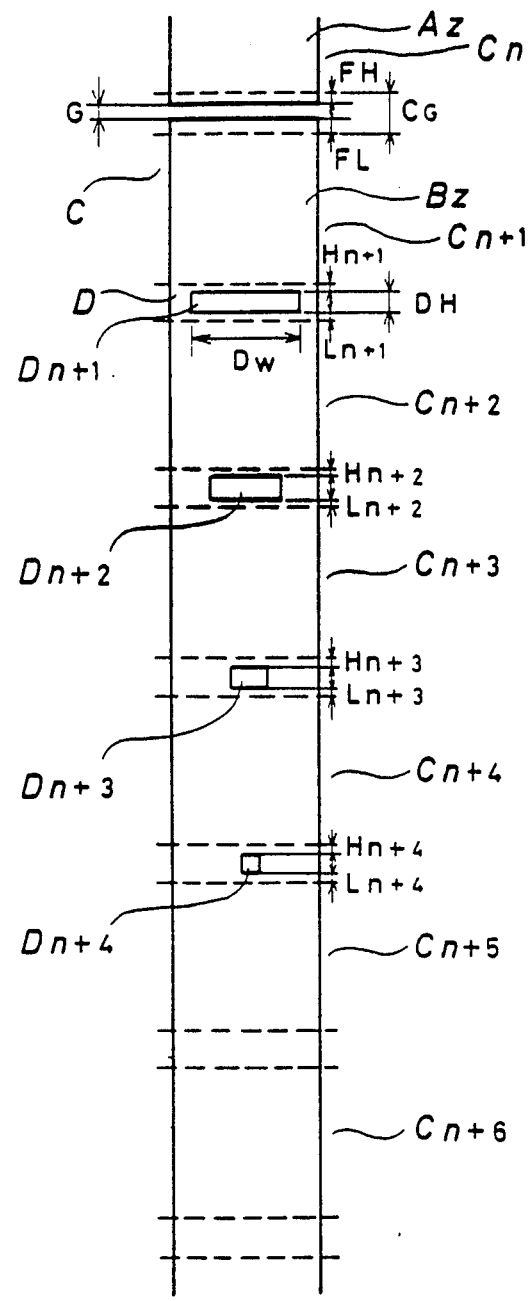
FIG. 3 is an enlarged view of the picture forming areas produced at the crossing of two signal electrodes over a plurality of scanning electrodes in the liquid crystal display of FIG. 2.

FIG. 3 shows an enlarged view of the electrodes near the extended end region of signal electrode $B_z$ of the liquid crystal display assembly of FIG. 2. Scanning electrodes $C_1, C_2, \ldots, C_n, C_{n+1}, C_{n+1}, C_{n+2}, \ldots$, are disposed at substantially equal intervals CG. The ends of signal electrodes $A_z$ and $B_z$ extend into the region between scanning electrodes $C_n$ and $C_{n+1}$ by as much as the distances FH and FL respectively. Signal electrode $B_z$ has inactive electrode area $D_{n+1}$ between scanning electrodes $C_{n+1}$ and $C_{n+2}$. According to the invention, an inactive electrode area D constitutes a means for changing the area of a picture element and, as such, has a width DW which is smaller than the width of signal electrode B and a height DH which is almost equal to the spacing between the adjacent scanning electrodes. In inactive electrode area $D_{n+1}$, the width DW is 80% of the width of signal electrode $B_z$ while in $D_{n+2}$, DW is 60%, and in $D_{n+3}$, DW is 20%. Height DH is the same in $D_{n+1}$, $D_{n+2}$, $D_{n+3}$, $D_{n+4}$. On the $A_z$ side, the inactive electrode areas D of the signal electrodes are also made smaller as they are located further away from the extended end region.

Figures 4A, 4B:
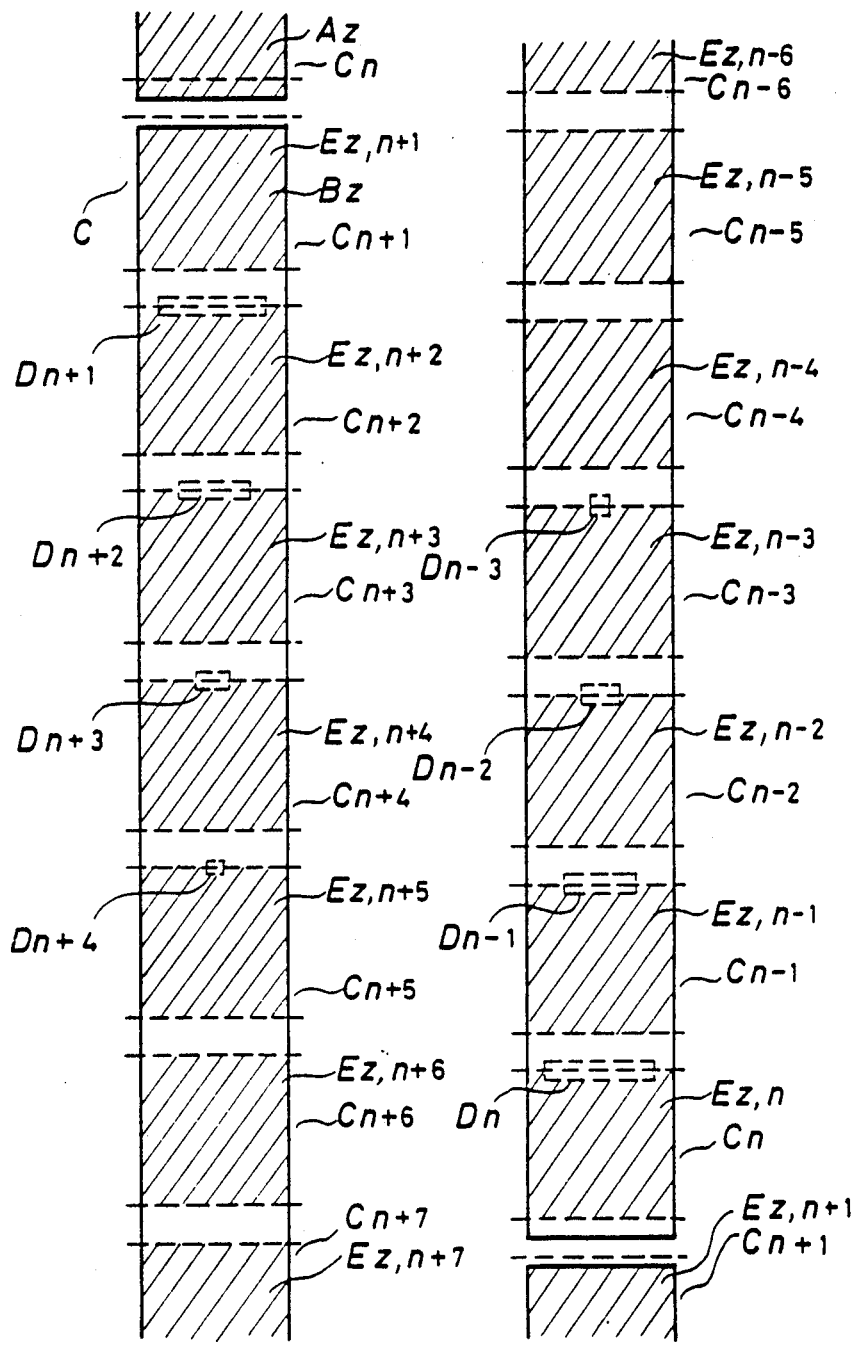
FIG. 4A and B show the effect of shifts of the electrodes of the liquid crystal display body of FIG. 3 from their nominal positions.

In FIG. 3, there was no displacement of signal electrodes $A_z$ and $B_z$ from the nominal position relative to scanning electrode C. In FIGS. 4A and B, the effect of relative displacement is shown. As can be seen in FIB. 4A, when relative displacement is produced by shifting of the upper and lower electrode units, such as by relative displacement of their substrates at the time of assembly, the area of picture element $E_{z, n+1}$ at the point of crossing of scanning electrode $C_{n+1}$ with signal electrode $B_z$ is reduced in proportion to the displacement. However, the areas of picture element $E_{z, n+2}$ at the crossings of scanning electrode $C_{n+2}$ with signal electrode $B_z$ is reduced less, due to the presence of inactive electrode area $D_{n+1}$, than is the case, for example, at electrode $C_{n+6}$. Thus the areas of picture elements $E_{z, n+3}$, at the crossing of scanning electrode $C_{n+3}$ with signal electrode $B_z$, and of picture element $E_{z, n+4}$, at the crossings of scanning electrode $C_{n+3}$ with signal electrode $B_z$, are also reduced due to the presence of respective inactive electrode areas $D_{n+3}$ and $D_{n+4}$. Since inactive electrode areas D become successively smaller in the sequence $D_{n+1}$, $D_{n+2}$, $D_{n+3}$, and $D_{n+4}$, the areas of the display picture elements E are reduced progressively less in the sequence of $E_{z, n+1'}$, $E_{z, n+2'}$, $E_{z, n+3'}$, $E_{z, n+4'}$. Since the eyes of man cannot see the change in an object which is changing gradually, so, here, even when letters, figures and pictures are displayed on a liquid crystal display device which has the abovedescribed displacement of the signal electrodes relative to the scanning electrodes, the display is not perceived as being divided along the boundary between scanning electrodes $C_n$ and $C_{n+1}$.

Variation between signal electrode $A_z$ and scanning electrode $C_n$ is generated as shown in FIG. 4B in the same way as was the case with signal electrode $B_z$ in the description of FIG. 4A. Here, the distances which the end portions of signal electrodes $A_z$ and $B_z$ extend beyond scanning electrodes $C_n$ and $C_{n+1}$ correspond to the dimensions FH and FL which were used in describing the nominal picture element forming positions of FIG. 3. Distances to the nominal picture element positions from inactive electrode areas $D_{n+1}$, $D_{n+2}$, $D_{n+3}$, and $D_{n+4}$, which serve to change the areas of the picture elements, are now considered as $H_{n+1}$, $L_{n+1}$, $H_{n+2}$, $L_{n+2}$, $H_{n+3}$, $L_{n+3}$, and $H_{n+4}$, $H_{n+4}$. Therefore, when distances FH and $H_{n+1}$, $H_{n+3}$, $H_{n+3}$, $H_{n+4}$ are made substantially equal, signal electrode $B_z$ shifts upward (on the paper) relative to scanning electrodes $C_n$, $C_{n+1}$, . . . and the areas of the picture elements at the crossings of signal electrodes $A_z$ with scanning electrodes $C_n$ becomes less (the distance FH becomes a minus value). Simultaneously, the areas of the picture elements at the crossings of signal electrodes $B_z$ with scanning electrodes $C_{n+1}$, . . . , $C_{n+4}$ are also reduced, step-by-step, due to the presence of inactive electrode areas $D_{n+1}$, . . . , $D_{n+4}$. In the same way, when distances FL and $L_{n+1}$, . . . , $L_{n+4}$ are made substantially equal, the areas of the picture elements at the crossings are also reduced, step-by-step, when the signal electrode $B_z$ shifts downward (on the paper) relative to scanning electrodes $C_{n+1}$.

Moreover, if the distances FH and FL are made almost equal and $H_{n+1}$, . . . , $H_{n+4}$ and $L_{n+1}$, . . . , $L_{n+4}$ are also made almost equal, the areas of the picture elements are equally changed, step-by step, even when the signal electrodes are shifted upward or downward, relative to the scanning electrodes.

Figures 5, 6:
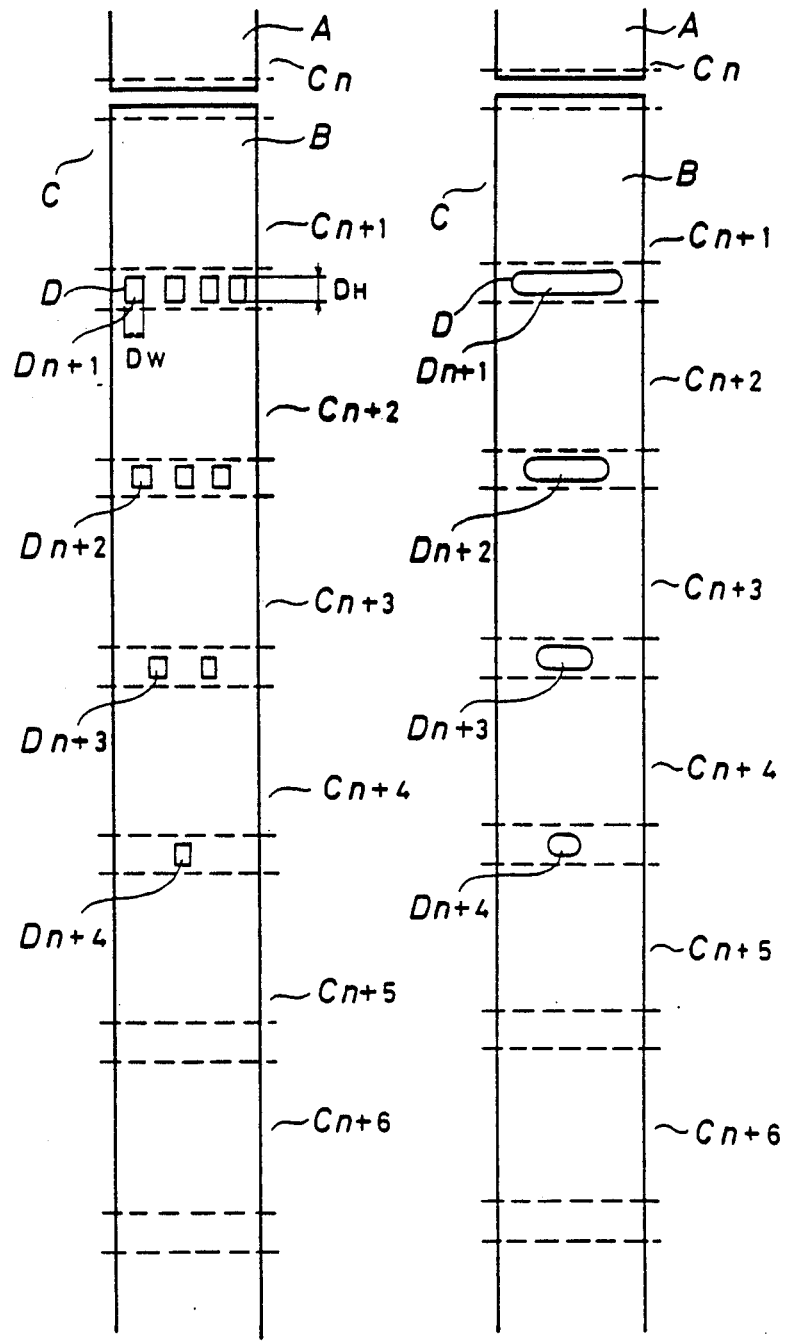
FIGS. 5 to 11 are enlarged views of electrode patterns which are useful in fabricating liquid crystal display bodies in accordance with the present invention.
Figures 7, 8:
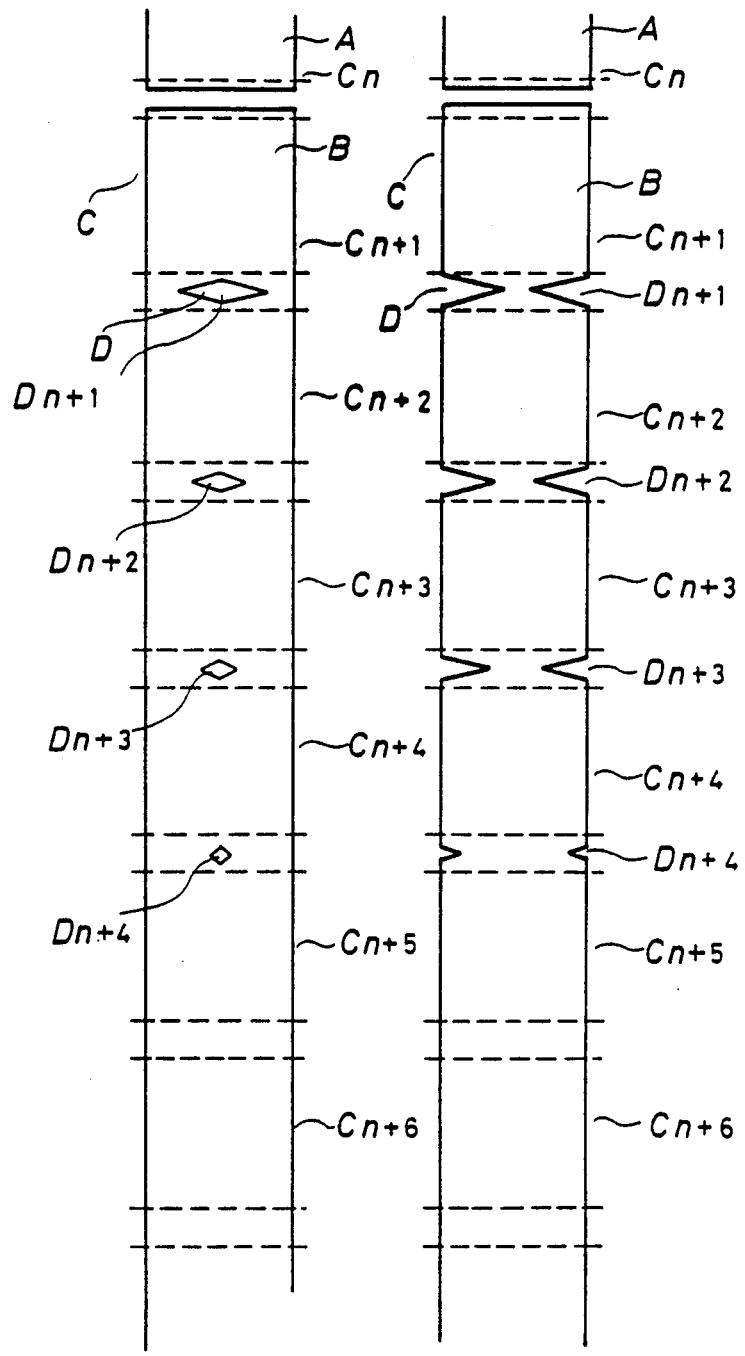
Figures 9, 10:
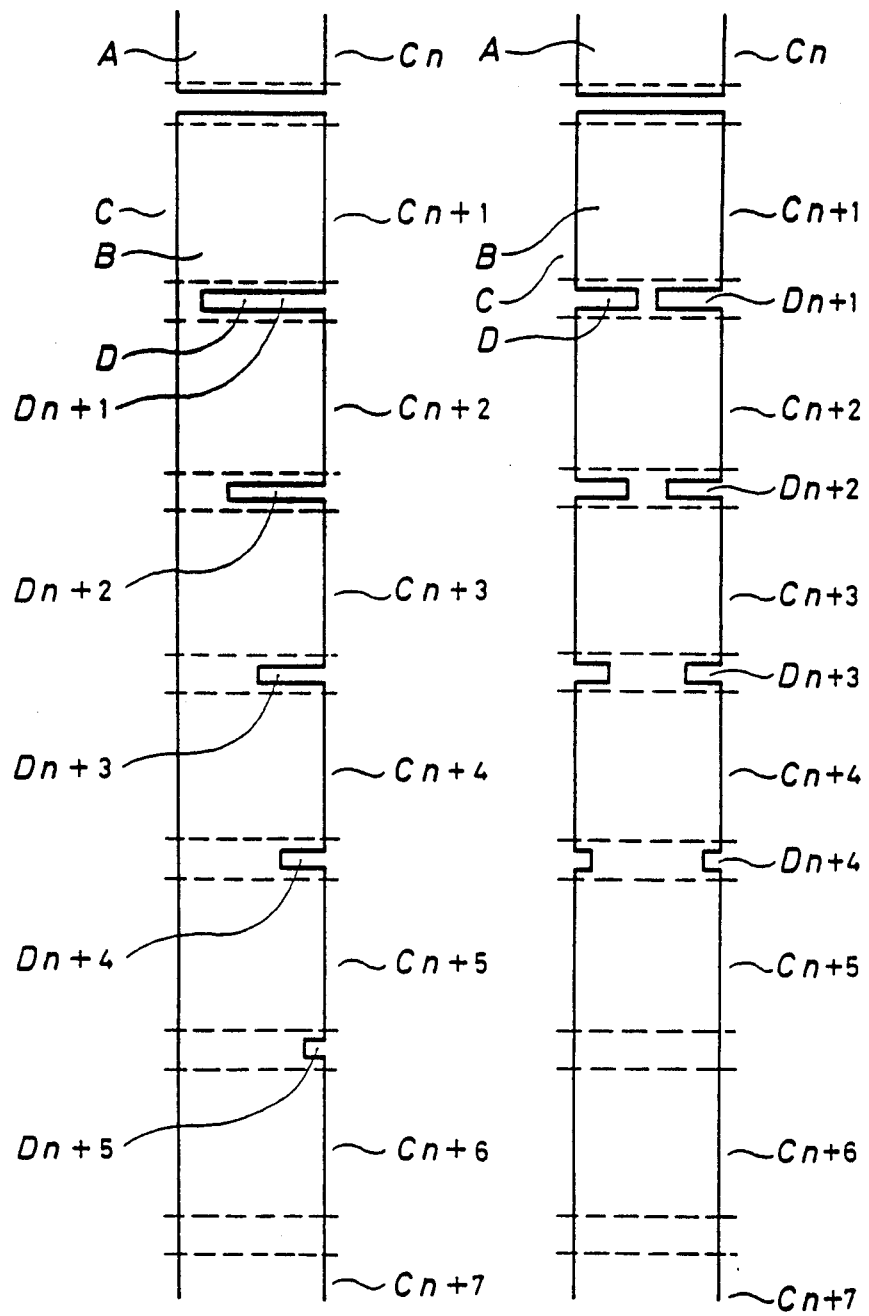
Figure 11:
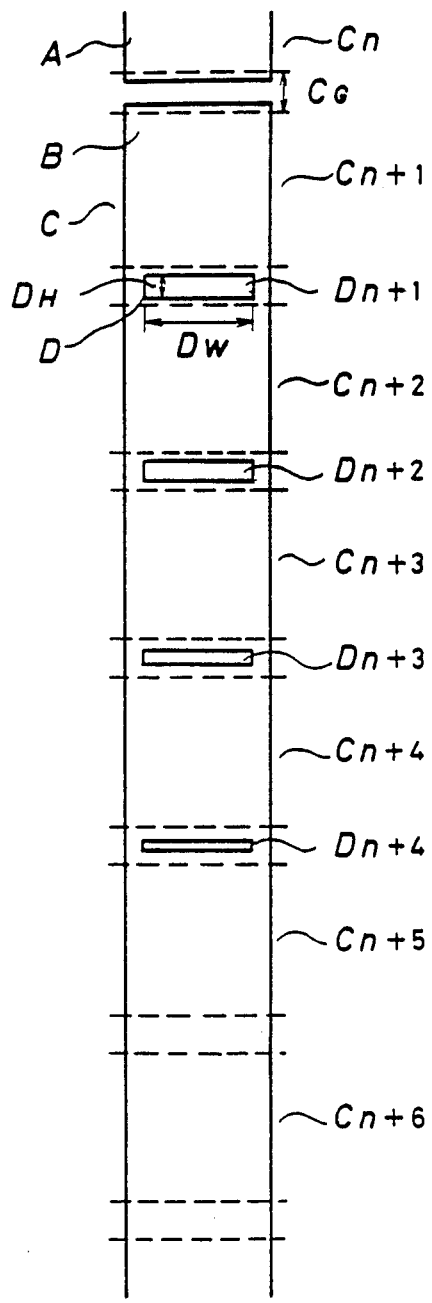

In a second embodiment, a liquid crystal display has been fabricated in the manner shown in FIG. 5. Here, an inactive electrode area D consists of a plurality of inactive segments which are substantially equal in size (the same width DW, and the same height DH) with the number of inactive areas reduced from four for $D_{n+1}$, to three for $D_{n+2}$, to two for $D_{n+3}$, and to one for $D_{n+4}$. In other words, the total inactive width DW in $D_{n+1}$ is 80% of that of signal electrodes B, that of $D_{n+2}$ is 60%, that of $D_{n+3}$ is 40% and that of $D_{n+4}$ is 20%. Other embodiments of the invention are as follows. The inactive electrode area D can take the form of an oval or an ellipse as shown in FIG. 6; a rhomb, as shown in FIG. 7; triangular portions on one or both sides of each signal electrode as shown in FIG. 8; or as rectangular portions extending in from one side of each signal electrode as shown in FIG. 9. the rectangular portions can also extend inwards from both sides of the signal electrodes as shown in FIG. 10. The inactive electrode areas D of FIG. 11, have equal widths DW in $D_{n+1}$ to $D_{n+4}$, but heights DH are gradually reduced from $D_{n+1}$ to $D_{n+4}$.

In another embodiment, the nominal distance FL by which the end portion of the signal electrode extends beyond scanning electrode $C_{n+1}$ (FIG. 3) is set approximately equal to half the distance CG between the adjacent scanning electrodes less half the height DH of the inactive electrode area ($D_{n+1}$, $D_{n+2}$, $D_{n+3}$, $D_{n+4}$), namely, (CG−DH)/2.

Figure 12:
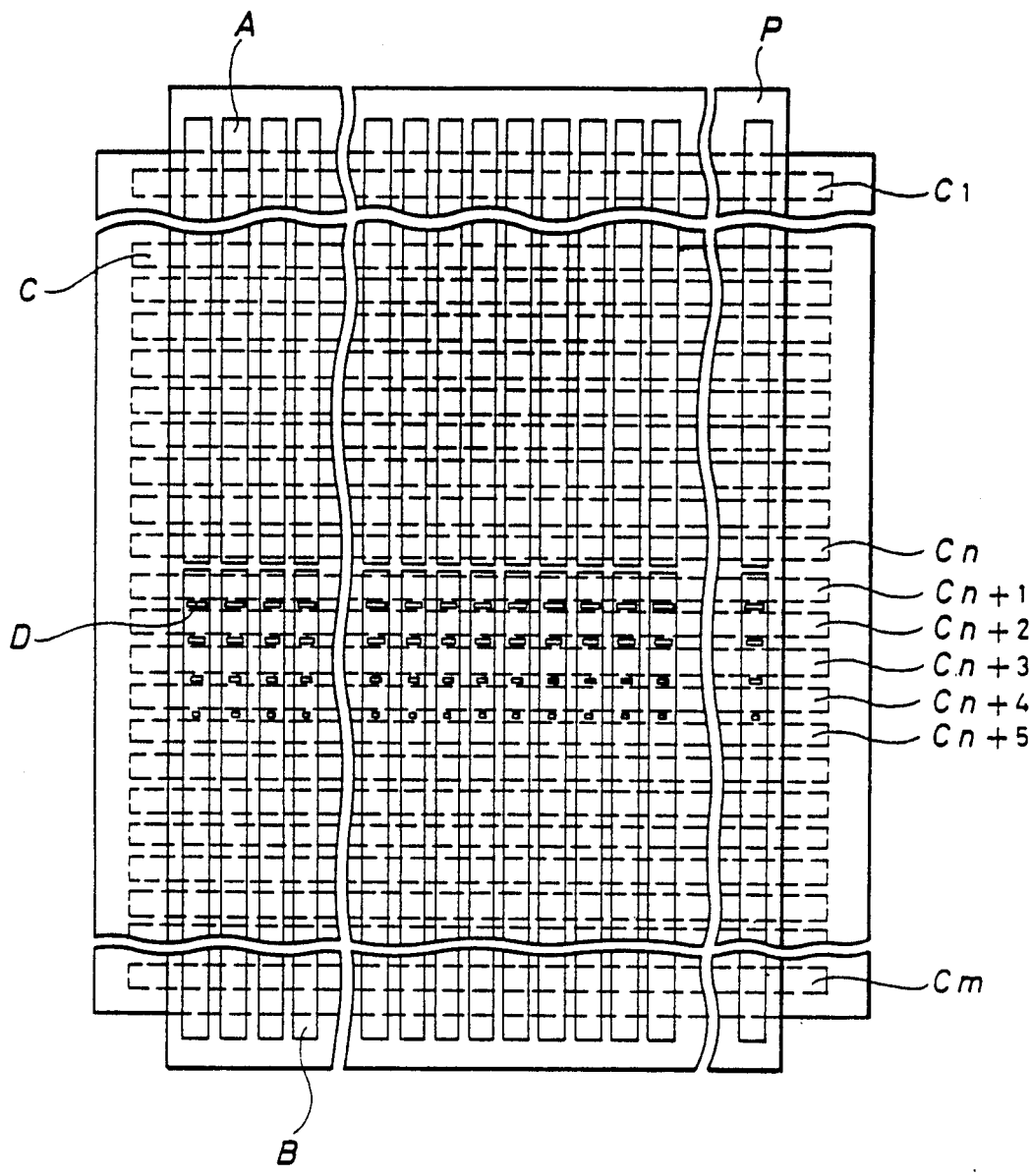
FIG. 12 shows another embodiment of a liquid crystal display device fabricated in accordance with with the present invention.

In the embodiment of FIG. 12, the inactive electrode areas D are provided only on set B of signal electrodes, there being no inactive areas on electrodes A. Using the dimensioning scheme shown in FIG. 3, the length of the portion of signal electrodes $B_z$ which extends beyond scanning electrodes $C_{n+1}$ is made approximately equal to half of the difference between height DH of the distance CG between scanning electrodes and the height DH of the inactive electrode area)/2. Signal electrode $A_z$ extends beyond scanning electrode $C_n$ by as much as the amount by which signal electrode $B_z$ extends beyond scanning electrode $C_{n+1}$, while preserving a spacing which ensures etching without short circuiting between signal electrode $A_z$ and $B_z$.

In all of the embodiments just described, the gaps between adjacent scanning electrodes are preferably made substantially equal to the gaps between adjacent signal electrodes and the widths of the scanning electrodes are preferably substantially equal to the widths of the signal electrodes.

Television pictures have been displayed using a liquid crystal display which was fabricated according to the present invention.

Figure 13:
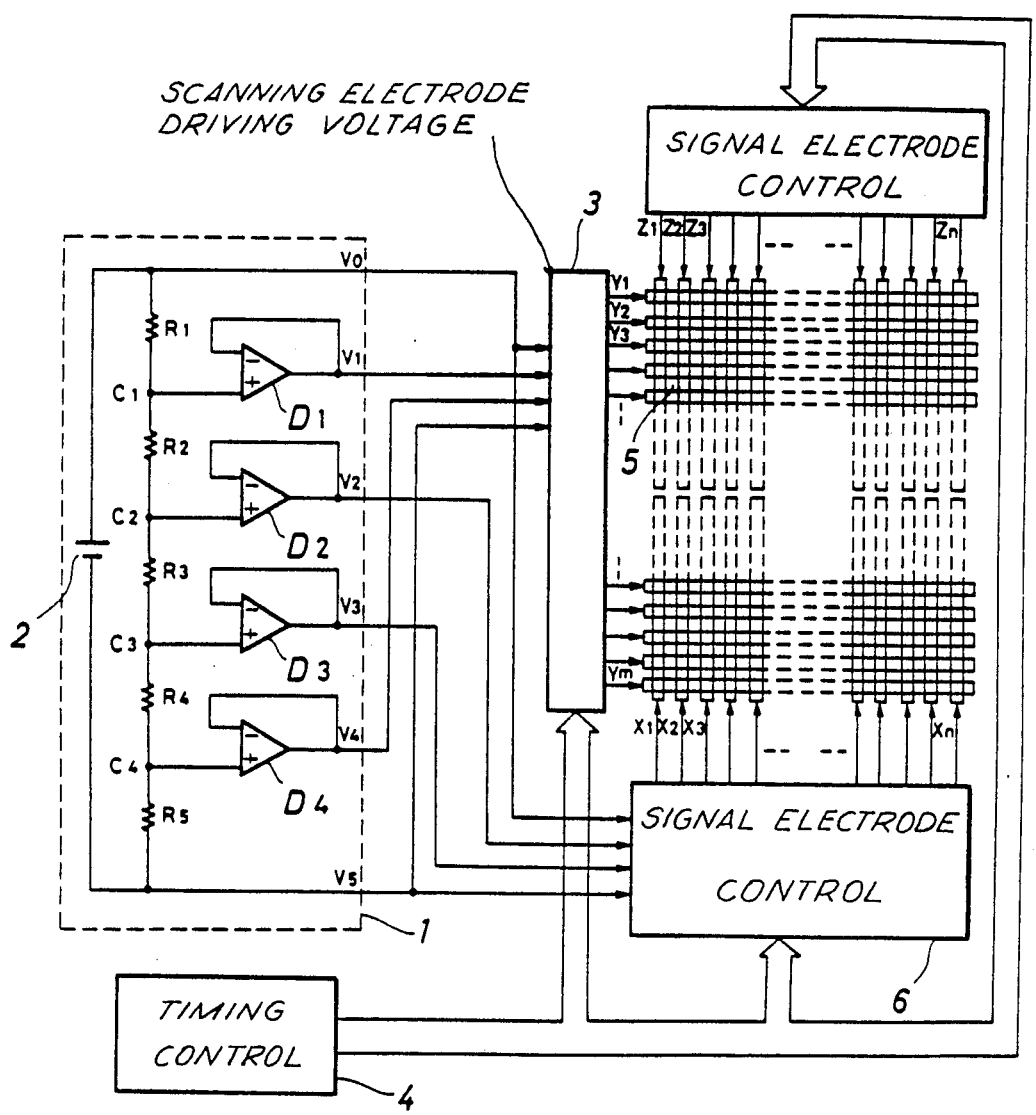
FIG. 13 shows a circuit for driving the display devices of the present invention.

FIG. 13 is a block diagram showing an example of a circuit which can be used for scanning liquid crystal displays fabricated in accordance with the present invention. Here, display drive voltage generating circuit supply 1 takes the form of an impedance converter in which the input terminals of operation amplifiers $D_1$, $D_2$, $D_3$, $D_4$ are respectively connected to intermediate points $C_1$, $C_2$, $C_3$, $C_4$ between five series-connected resistors $R_1$, $R_2$, $R_3$, $R_4$, $R_5$ which are connected as a voltage divider. Output voltage $E_o$ from power source 2 is applied across the voltage divider and supplies a voltage for turning on the picture elements. The other input terminals of the operational amplifiers are connected to the respective amplifier output terminals. The voltage $E_0$ is divided into voltages $V_0$, $V_1$, $V_2$, $V_3$, $V_4$ and $V_5$ as indicated below.

$$V_0 = E_0$$

$$V_1 = [1 - 1/K(N+1)]E_0$$

$$V_2 = [1 - 2/(N+1)]E_0$$

$$V_3 = [2/N+1)]E_0$$

$$V_4 = [1/K(N+1)]E_0$$

$$V_5 = 0$$

where N is the number of scanning lines and K is a constant equal to or larger than 1 which is dependent on the matrix-type liquid crystal panel to be used.

Scanning electrode drive circuit 3 responds to drive voltages $V_0$, $V_1$, and $V_4$ from drive voltage supply 1 and to a timing signal from timing control 4 to sequentially scan scanning electrodes $Y_1$, $Y_2$, ..., $Y_m$ of matrix-type liquid crystal display panel 5. Signal electrode control circuit 6 responds to voltages $V_0$, $V_2$, and $V_3$ from display supply 1 and to the signal sent from timing control 4 to sequentially scan signal electrodes $X_1$, $X_2$, ..., $X_n$ and $Z_1$, $Z_2$, ..., $Z_n$.

Operation of the electrode scanning circuit of FIG. 13 is explained with reference to the waveforms shown in FIGS. 14A, 14B, and 14C.

When a video signal is input to timing control 4, a drive voltage (FIG. 14A) is applied to scanning electrodes $Y_1$, $Y_2$, ..., $Y_m$ from scanning electrode drive 3 in accordance with the synchronizing pulse in the video signal and voltages $V_5$, $V_0$ are applied to the selected scanning electrodes, while voltages $V_4$, $V_1$ are applied to the non-selected scanning electrodes. Meanwhile, signal electrode drive circuit 6 outputs a drive signal (FIG. 14B) to the signal electrodes and the line scanning is sequentially carried out while voltages $V_2$, $V_3$ are applied to the non-selected electrodes.

Figure 14:
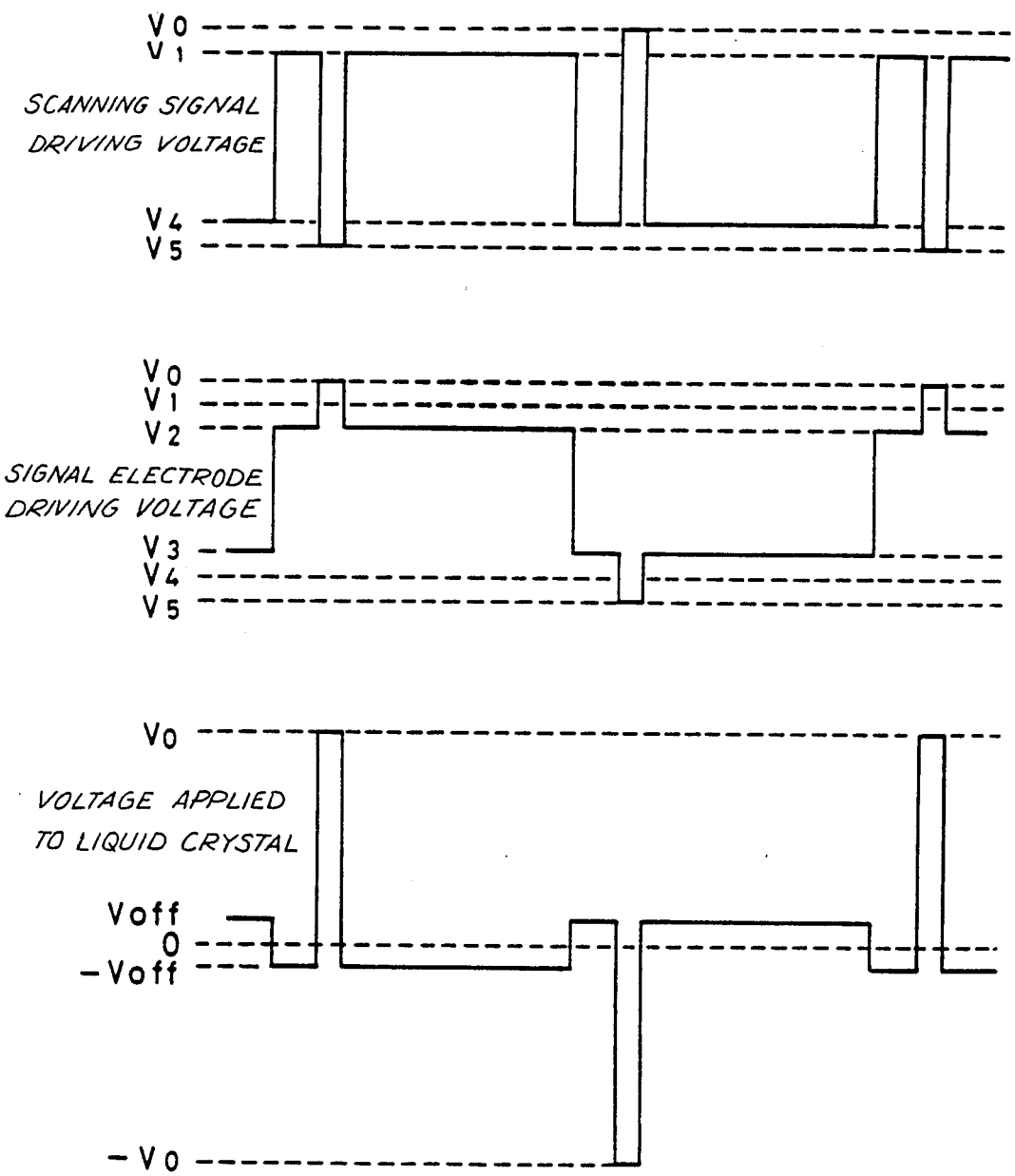
FIGS. 14A, 14B, and 14C show waveforms in the display device driving circuit of FIG. 13.

At this time, the voltages $/V_2-V_1/$, $/V_3-V_4/$, namely an AC voltage having the effective value of $[(2K-1)/K(N+1)]E_0 = (2-1/K) \times 1/N+1)E_0$
$1/(N+1)E_0$ is applied to the non-selected picture elements. The drive signals to be applied to the liquid crystal panel, namely the waveforms driving the scanning electrodes, the signal electrodes, and the liquid crystal, are formed as shown in FIG. 14. Therefore the picture elements of a picture to be displayed on the panel are each driven with a contrast corresponding, on a one-to-one basis, to the contrast ordered in dependence on the video signal. Thereby tonal pictures can be displayed.

In above-described embodiments of the matrix-type crystal display, the area of a picture element may be changed by cutting away a portion of an electrode or by means of a mask. Such a mask will be appropriately shaped and positioned between adjacent picture elements near the extended end portions of opposing electrodes. The mask is usually provided on the electrode substrate, polarizer or reflector. It is preferable to place it on the side of the electrode substrate which faces the liquid crystal layer. A layer formed as a black, white, blue and red screen gravure or by offset-printing, or a metal layer formed by the vacuum-deposition, sputtering or printing of CVD, nickel, chromium, silver or copper can be used as the mask.

Figures 15A, 15B:
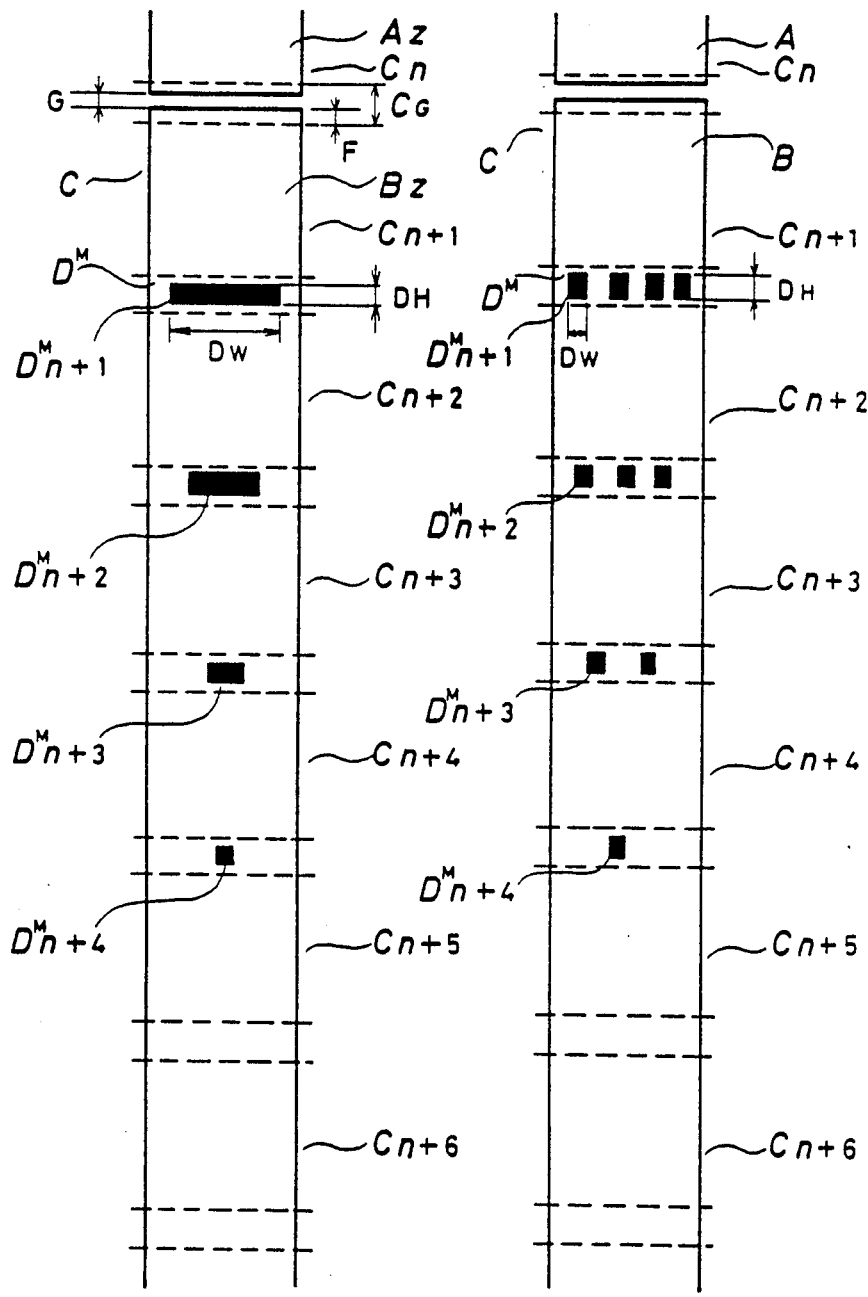
FIGS. 15A and 15B show still another embodiment of the liquid crystal display device of the present invention wherein the areas of the picture elements are reduced by masks.
Figures 15C, 15D:
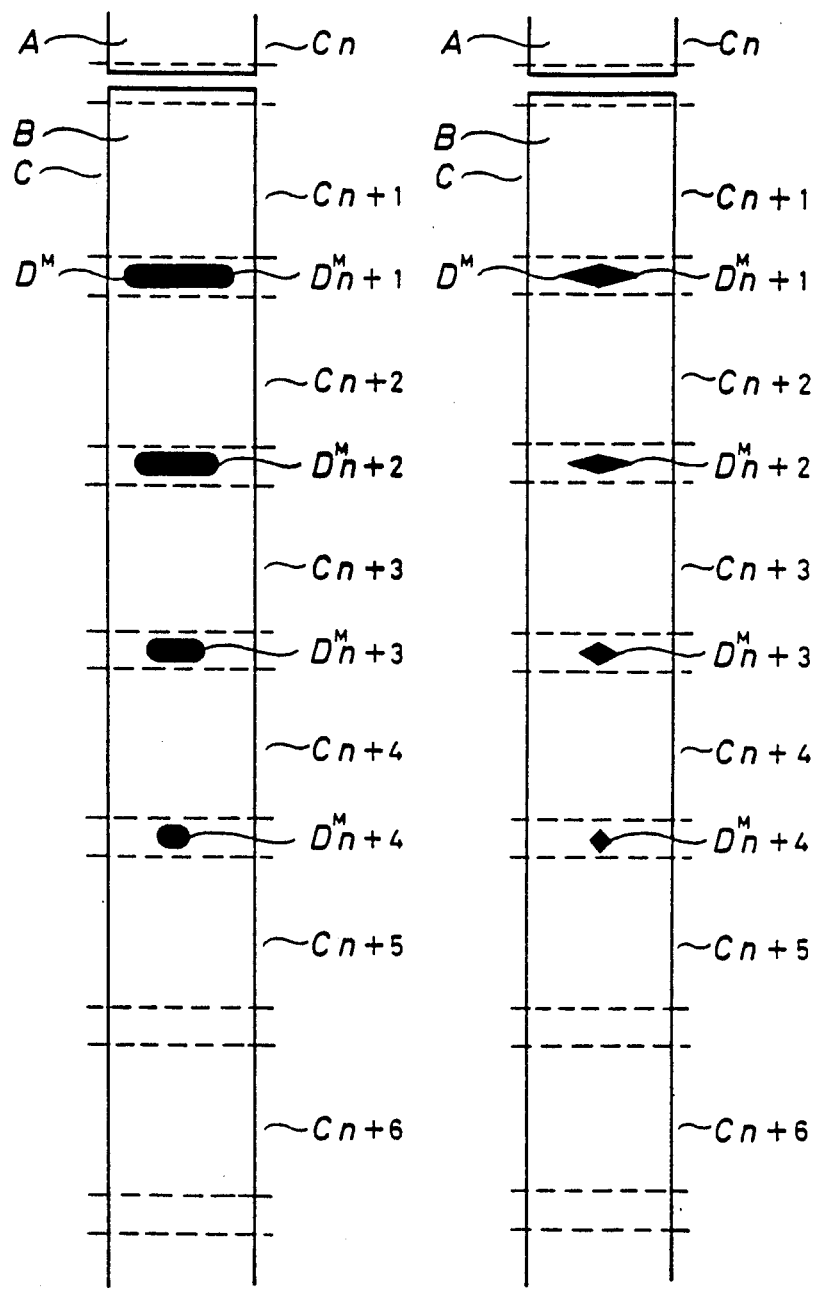
Figures 15E, 15F:
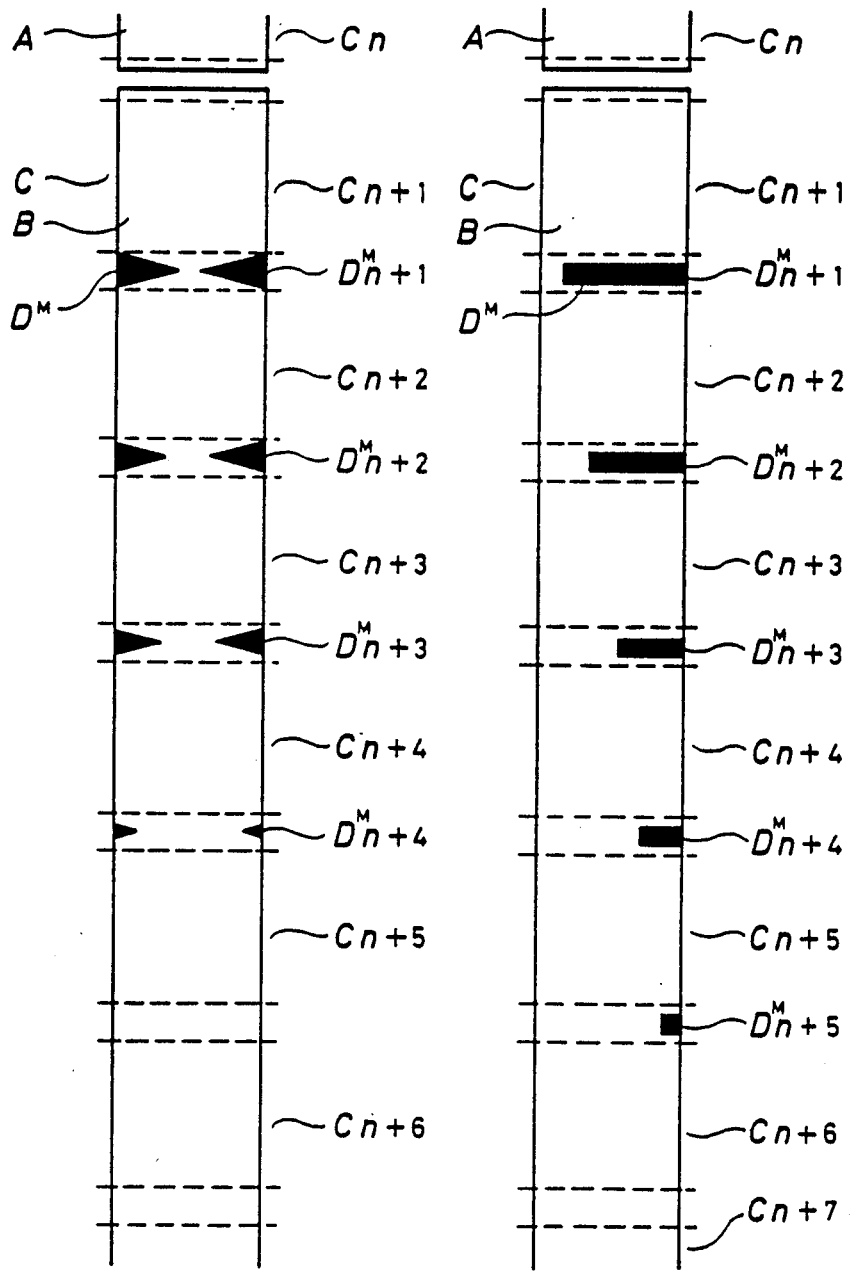
Figures 15G, 15H:
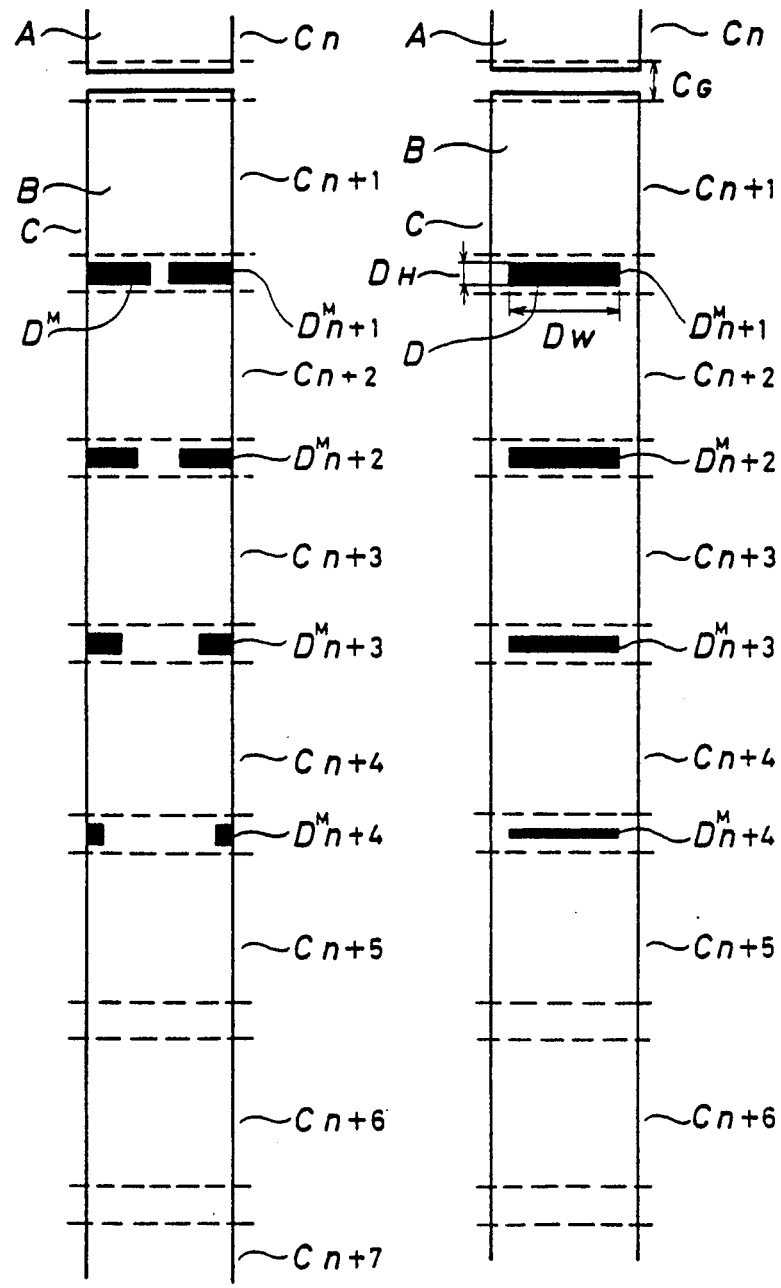

Examples of the formation of masks for changing the area of a picture element area shown in FIG. 15A to H. In these figures, $D^M$ is a mask used for changing the areas of the picture element and these masks are indicated as $D^M_{n+1}$, $D^M_{n+2}$, $D^M_{n+3}$, and $D^M_{n+4}$. FIG. 15A corresponds to FIG. 3, FIG. 15B to FIG. 5, FIG. 15C to FIG. 6, FIG. 15D to FIG. 7, FIG. 15E to FIG. 8, FIG. 15F to FIG. 9, FIG. 15G to FIG. 10, and FIG. 15A to FIG. 11. The above-described method of providing the inactive electrode areas functions in the same way as with the cut-away embodiments of the earlier described figures.

The above embodiments have been developed upon the premise that the picture elements are substantially square. However, it will be clear to those skilled in the art that the picture elements may be polygonal, such as rectangular, rhombic, pentagonal and hexagonal, and can also be elliptical or circular. When the picture element is rectangular, the division of the display screen becomes less marked if the sides of the rectangles lie in the direction of the extended electrodes.

The electrodes of a liquid crystal display device in accordance with the present invention may be made of tin oxide, indium oxide, ITO, etc. and are transparent. The electrode substrates may consist of glass plates or plastic films, etc.

For one set of signal electrodes, about 3 to 20 inactive electrode areas are formed, and, more preferably, 5 to 15 inactive areas are formed and it is preferred to gradually reduce the inactive electrode areas as the distance from the region of extended electrodes increases. The invention may be used with positive, negative, or color printing at the picture elements. Moreover, the signal electrodes and the scanning electrodes can be substitue of for each other in the above-described embodiments. For example, in the embodiment of FIG. 2, electrodes A and B can be used as scanning electrodes while electrodes C are used as signal electrodes.

The present invention can be realized, furthermore, in FIG. 2, by using electrodes A as signal electrodes, $C_{n+1}$, ..., $C_m$ as signal electrodes, and electrodes B and $C_1$, ..., $C_n$ as scanning electrodes.

As described above, the liquid crystal display device of the present invention is a matrix-type liquid crystal display device in which electrodes are provided on substrates which face each other through liquid crystal. The electrodes cross each other so as to form picture elements at the crossing points. On at least one substrate, the electrodes are cut in half to provide electrode sets and have end portions which lie between crossing electrodes in the display region. If the crossed electrodes are displaced, during assembly, from the design positions, the areas of the picture forming elements in the vicinity of the extended end portions is changed compared to the areas of the more distant picture elements. Therefore the area of the display is not seen as divided where the extended end portions of the electrodes meet, and, accordingly, excellent display quality is assured.

When a liquid crystal display is constructed in accordance with the present invention by extending the signal electrodes inwards from two sides, there is no need for wiring connecting the picture elements, such as is required in multiplex matrix type displays, and therefore the picture elements can occupy a larger part of the display area. However, when the signal electrodes extend from both sides, when the patterns of the signal electrodes and the scanning electrodes are displaced in the region where the extended end portions of the signal electrodes meet, the display area is seen as divided into two sections. By virtue of the present invention, inactive electrode areas are provided in appropriate areas between adjacent picture forming elements near the region containing the extended end portions of the signal electrodes and therefore the display area is not seen as divided into two sections. High display quality can be thus be obtained even when there is a difference in patterns between the electrodes.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A matrix-type liquid crystal display device having an area for the display of images, the device comprising:
   a first substrate carrying a set of spaced-apart electrodes;
   a second substrate carrying a set of spaced-apart electrodes, the second substrate being nominally positioned relative to the first substrate so that ends of the electrodes of the second substrate extend into a region between two adjacent electrodes on the first substrate in the display area;
   a layer of liquid crystal placed between the substrates so as to constitute picture forming elements at the facing intersections of the electrodes of the first substrate and the electrodes of the second substrate; and
   means for changing the areas of the picture forming elements adjacent to at least one side of the region between two adjacent electrodes of the first substrate into which the ends of the electrodes of the second substrate extend, whereby errors in the display are reduced when the substrates, as assembled, are displaced from the nominal position.

2. A display device in accordance with claim 1 wherein the areas of the adjacent picture forming elements are reduced by an amount which is related to the displacement of the substrate from the nominal position.

3. A display device in accordance with claim 1 wherein areas of a selected group of adjacent picture forming elements formed by a plurality of the electrodes on one side of the region into which ends of the electrodes of the second substrate extend are reduced stepwise by lesser amounts as the distance of the picture forming elements from the region is increased.

4. A display device in accordance with claim 3 in which the areas of picture forming elements formed by at least three and not more than twenty electrodes on one side of the region are reduced stepwise.

5. A display device in accordance with claim 3 in which the areas of picture forming elements formed by at least five and not more than fifteen electrodes on one side of the region are reduced stepwise.

6. A display device in accordance with claim 1 wherein the means for changing the areas of picture forming elements are provided on the second substrate.

7. A display device in accordance with claim 1 wherein the means for changing the areas of picture forming elements are positioned on the second substrate so as to lie between the nominal positions of electrodes on the first substrate which are adjacent to at least one side of the region into which the ends of the electrodes of the second substrate extend.

8. A display device in accordance with claim 7 wherein the means for reducing the areas of the picture forming elements comprise at least one portion cut-away from each electrode on the second substrate having an end which extends into the region and is located on at least the one side of the region.

9. A display device in accordance with claim 7 wherein the means for reducing the areas of picture forming elements comprises light shielding mask means positioned between the nominal positions of electrodes on the first substrate which are adjacent to at least the one side of the region into which the ends of the electrodes of the second substrate extend.

10. A display device in accordance with claim 1 wherein the electrodes on the first substrate comprise scanning electrodes and the electrodes on the second substrate comprise signal electrodes.

11. A display device in accordance with claim 10 wherein there are two sets of signal electrodes having ends which extend into the region from both sides of the second substrate wherein the means for changing the areas of picture forming elements are provided on the second substrate on at least one side of the region.

12. A display device in accordance with claim 11, wherein the means for changing areas of picture forming elements comprise at least one cut-away portion of each signal electrode between the nominal position of the picture forming elements adjacent to at least the one side of the region.

13. A display device in accordance with claim 12, including at least two cut-away portions of each signal electrode between the nominal positions of the picture forming elements adjacent to said one side of the region, the area of the cut-away portions of each signal electrode decreasing as its distance from the region increases.

14. A display device in accordance with claim 11, wherein the means for changing the areas of the picture forming elements are centrally located on the width of each signal electrode and take the form of a shape selected from the group including a rectangle, an ellipse, a rhomb and a triangle.

15. A display device in accordance with claim 11, wherein the means for changing the areas of the picture forming elements are located on the periphery of the signal electrode and take the form of a shape selected from the group including a rectangle, an elipse, a rhomb and a triangle.

16. A display device in acordance with claim 11, wherein the means for changing the areas of the picture forming elements comprises a light shielding mask positioned between the nominal positions of each picture forming element on one side of the region in registration with each signal electrode.

17. A display device in accordance with claim 16, including at least two light shielding masks over each signal electrode between the nominal positions of the picture forming elements adjacent to the one side of the region, the area of the light shielding mask over each signal electrode decreasing as its distance from the region increases.

18. A display device in accordance with claim 10 wherein there are two sets of signal electrodes, the ends of which extend into the region from both sides of the second substrate and in which the means for changing the areas of picture forming elements are provided on the second substrate on of both sides of the region.

19. A display device in accordance with claim 18, wherein the means for changing the areas of picture forming elements comprise at least one cut-away portion of each signal electrode between the nominal positions of adjacent picture forming elements on both sides of the region.

20. A display device in accordance with claim 19, including at least two cut-away portions of each signal electrode between the nominal positions of the picture forming elements adjacent to both sides of the region, the area of the cut-away portions of each signal electrode decreasing as the distance from the region increases.

21. A display device in accordance with claim 18, wherein the means for reducing the areas of the picture forming elements comprise a light shielding mask positioned between the nominal positions of adjacent picture forming elements on both sides of the region in registration with each signal electrode.

22. A display device in accordance with claim 10 wherein the means for changing the areas of the picture forming elements comprises a light shielding mask positioned between the nominal positions of adjacent picture forming elements on both sides of the region and in registration with each signal electrode.

23. A display device in accordance with claim 10, wherein the means for changing the areas of the picture forming elements are oblong and have a fixed height, in which the means for changing the areas between electrodes reduces said area at progressively greater distances from the region by reducing the length of the oblong in step-by-step increments.

24. A display device in accordance with claim 10 wherein the means for changing the areas of the picture forming elements are oblong in shape and have a fixed length, the means for changing the areas between electrodes reduces said area at successively greater distances from the region by reducing the height of the oblongs in step-by-step increments.

25. A display device in accordance with claim 10 wherein the distance by which the signal electrodes extend into the region is almost equal to the distance by which adjacent scanning electrodes are spaced apart, leaving only a space therebetween sufficient to prevent inter-electrode shorting or leakage.

26. A matrix-type liquid crystals display device having a display area for an image, the device comprising:
 a first substrate carrying a set of spaced-apart electrodes;
 a second substrate carrying two sets of spaced-apart electrodes which are so positioned relative to each other that the ends of one of two sets nearly meet the ends of the electrodes of the other of the two sets, the second substrate being nominally positioned relative to the first set so that the ends of the electrodes which nearly meet extend into a region between two adjacent electrodes on the first substrate;
 a layer of liquid crystals placed between the substrates so as to constitute individual picture forming elements at points of crossing of the electrodes of the first substrate over the electrodes of the second substrate; and
 means, comprising at least one of cut-away portions of the electrodes on the second substrate and masks on the second substrate which are situated between the nominal positions of at least two electrodes on the first substrate adjacent to the region, for reducing the areas of the picture forming elements adjacent to the region into which the ends of the electrodes extend when the substrates are assembled so as to be shifted from the nominal position, whereby apparent division of images produced in the display area is prevented.

* * * * *